United States Patent [19]

Suciu et al.

[11] 4,415,460
[45] Nov. 15, 1983

[54] OXIDATION OF ORGANICS IN AQUEOUS SALT SOLUTIONS

[75] Inventors: George D. Suciu, Ridgewood; John E. Paustian, Whippany, both of N.J.

[73] Assignee: The Lummus Company, Del.

[21] Appl. No.: 369,352

[22] Filed: Apr. 19, 1982

Related U.S. Application Data

[60] Continuation of Ser. No. 157,117, Jun. 6, 1980, abandoned, which is a division of Ser. No. 61,743, Jul. 30, 1979, Pat. No. 4,240,885.

[51] Int. Cl.³ .............................................. C02F 1/76
[52] U.S. Cl. ..................................... 210/754; 204/80; 204/98; 204/158 HA; 210/758; 210/765; 210/766; 210/908
[58] Field of Search .................... 204/80, 98, 158 HA; 210/721, 753, 754, 756, 758, 765, 766, 908, 909; 260/348.21; 423/155, 204, 206 R, 437

[56] References Cited

U.S. PATENT DOCUMENTS

| 3,819,516 | 6/1974 | Morchison et al. | 210/763 |
| 3,839,169 | 10/1974 | Moyer | 204/158 HA |
| 3,843,516 | 10/1974 | Yamada et al. | 210/754 |
| 4,008,133 | 2/1977 | Gelbein et al. | 204/80 |
| 4,013,757 | 3/1977 | Berkowitz et al. | 210/754 |
| 4,126,526 | 11/1978 | Kwon et al. | 204/98 |
| 4,219,418 | 8/1980 | Pilon | 210/721 |

FOREIGN PATENT DOCUMENTS

| 5056745 | 5/1975 | Japan | 210/754 |
| 1387909 | 3/1975 | United Kingdom | 210/755 |

Primary Examiner—Peter A. Hruskoci
Attorney, Agent, or Firm—Elliot M. Olstein; Louis E. Marn

[57] ABSTRACT

Organic impurities in aqueous salt solutions; e.g., alkali or alkaline earth chloride solutions in particular, brines, are oxidized with chlorate ions at a pH of no greater than 5.0 and a temperature of at least 130° C. to convert the organics to carbon dioxide. The process has particular applicability to oxidation of organic impurities in an aqueous brine solution derived from the saponification of a chlorohydrin to olefin oxide, prior to introduction of the brine into an electrolytic cell.

19 Claims, 3 Drawing Figures

OXIDATION OF ORGANICS IN AQUEOUS SALT SOLUTIONS

This application is a continuation of U.S. application Ser. No. 157,117, filed on June 6, 1980 and now abandoned, with the aforementioned application being a division of U.S. application Ser. No. 61,743, filed on July 30, 1979, and now U.S. Pat. No. 4,240,885.

This invention relates to the treatment of aqueous salt solutions containing organic impurities, and more particularly to oxidation of such organic impurities to carbon dioxide. This invention has particular applicability to the treatment of aqueous alkali or alkaline earth chloride solutions derived from the saponification of a chlorohydrin to an olefin oxide.

In many cases, there is produced an aqueous salt solution, which contains organic impurities, and the removal of such organic impurities by oxidation thereof should be effected prior to use or discarding of such solutions. Thus, for example, in the production of an epoxy compound, such as propylene oxide via the chlorohydrin route, the aqueous alkali chloride solution produced in the saponification includes organic impurities. In many cases, such aqueous alkali chloride solutions should be treated to reduce the organic impurity content thereof. Thus, for example, in a process which integrates the electrolytic production of chlorine with the production of olefin oxide, the aqueous alkali chloride solution; in particular, brine derived from the saponification step is recycled to the electrolytic cell. Such processes are described, for example, in U.S. Pat. No. 3,455,797 and U.S. Pat. No. 4,008,133. The brine solution to be introduced into the cell, and derived from the saponification, includes organic impurities, and the electrolytic cells cannot tolerate organic compounds above a certain level. As a result, it is necessary to treat all or a portion of the brine solution prior to introduction into the cell in order to reduce the organic impurity content to a value which can be tolerated by the cell. In U.S. Pat. No. 4,126,526, there is disclosed a process for treating such brine solutions with chlorine in order to convert the organic impurities to more volatile organic compounds which can be removed from the brine solution prior to introduction of such brine solution into the electrolytic cell.

The present invention is directed to a new and improved process for treating aqueous salt solutions in particular; alkali or alkaline earth chloride solutions, which contain organic impurities, in order to oxidize the carbon atoms of the organic impurities to carbon dioxide. The invention has particular applicability to a process for producing an olefin oxide, and is most particularly applicable to a process for production and olefin oxide which is integrated with an electrolytic process for producing chlorine from aqueous alkali chloride solutions.

In accordance with the present invention, there is provided a process for treating an aqueous salt solution; in particular, alkali or alkaline earth chloride solution, which contains organic impurities, wherein the organic impurities are oxidized with chlorate ions at a pH of no greater than 5.0, and a temperature of at least 130° C. to convert the carbon atoms of the organics to carbon dioxide. The aqueous alkali or alkaline earth chloride solution may be either potassium chloride, sodium chloride, calcium chloride, or magnesium chloride and is preferably an aqueous brine solution (sodium chloride).

Applicant has found that, contrary to prior art teachings, the carbon atoms of the organic compounds can be oxidized to carbon dioxide in aqueous salt solutions by the use of chlorate ions, and without the use of a catalyst, by effecting the oxidation at an acidic pH; i.e., a pH of no greater than 5.0, and at an elevated temperature; i.e., a temperature of at least 130° C. The oxidation with chlorate ion is favored by lower pH, and higher temperature. Thus, in general, the pH of the oxidation is below 4, preferably below 3 with the best results being obtained at a pH of below 1. The temperature, as hereinabove described, is at least 130° C., with the temperature preferably being at least 140° C. Although higher temperatures can be employed, in general, temperatures greater than 180° C. are not required.

The chlorate ion is employed in an amount sufficient to effect oxidation of the organic impurities, with the chlorate ion concentration generally being at least 0.1 mole and preferably at least 0.5 mole, per atom of contained organic carbon. The chlorate ions should not be employed in too great an excess in order to avoid excess chlorate ions in the treated product. In general, the chlorate ion concentration does not exceed 1 mole, and most generally does not exceed 0.8 mole, per atom of contained organic carbon. The contacting of the aqueous salt solution with the chlorate ion at an elevated temperature and acidic pH is effected for a time sufficient to provide the desired reduction of organics by oxidation of the organics to carbon dioxide. In general, for most applications, the residence time may be in the order of from about 15 to 30 minutes or less.

The chlorate ion is generally provided as an alkali chlorate or alkaline earth chlorate, depending on the salt solution to be treated. The chlorate ion for use in the oxidation may be produced by procedures known in the art. Thus, for example, chlorate ion may be produced by passing chlorine through a solution of alkali hydroxide, or a caustic solution containing hypochlorite ion followed by heating which results in disproporationation of the hypochlorite ion to chlorate ion and chloride ion. As a further alternative, the chlorate ion may be produced by electrolysis of alkali chloride in a cell with no diaphragm at elevated temperatures; e.g., 80° C.–90° C. As a further alternative, the chlorate ion may be generated, in situ, by introducing hypochlorite ion; for example, as sodium hypochlorite or potassium hypochlorite, which can be converted, in situ, to chlorate ion under conditions known to the art.

The invention will be further described with respect to alkali chlorides; however, the teachings are applicable to other salt solutions, such as alkaline earth chlorides. The aspects of the invention directed to use of cell liquor for saponification of chlorohydrin are of course particularly directed to alkali chlorides, and in particular brines.

In accordance with a particular aspect of the present invention, the oxidation of organic impurities present in an aqueous alkali chloride solution is effected with respect to an aqueous alkali chloride solution derived from the saponification of chlorohydrin in a process directed to the production of an olefin oxide. Thus, in the production of an olefin oxide via chlorohydrin, chlorohydrin is contacted with an aqueous solution which includes an alkali hydroxide; in particular, sodium hydroxide to saponify the chlorohydrin to an olefin oxide, and produce an aqueous alkali chloride solution, and such aqueous alkali chloride solution generally includes organic impurities, such as glycols, aldehydes, ethers, carboxylic acids, hydroxy carboxylic acids, hydroxyketones, chloroketones, chloro-organic acids, ketoacids, chloro-alcohols and the like. Such aqueous alkali chloride solutions, containing organic impurities, may be treated with chlorate ions in accordance with the present invention to oxidize the carbon atoms of such organic impurities to carbon dioxide.

In accordance with the most preferred aspect of the present invention, there is provided an improvement in an overall process for producing olefin oxide via the chlorohydrin, which is integrated with a process for producing chlorine in an electrolytic cell. In accordance with such a process, the aqueous alkali chloride solution; in particular, aqueous brine, derived from the saponification of chlorohydrin to olefin oxide, which contains organic impurities, is treated with the chlorate ion in accordance with the present invention to oxidize organic impurities to carbon dioxide, prior to introduction of the brine into the electrolytic cell for the production of chlorine. In this manner, the organics present in such brine solutions can be reduced to a value which can be tolerated by the electrolytic cell.

In accordance with a particularly preferred aspect of the present invention, the treatment of aqueous alkali chloride solutions is incorporated into a process for producing epoxy compounds from olefinic compounds, which is integrated with an electrolytic process for producing chlorine by contacting of chlorine produced in the cell with tertiary alkanol in cell liquor derived from the cathode compartment of the cell, which contains sodium hydroxide and sodium chloride to produce tertiary alkyl hypochlorite, which is contacted with an olefinically unsaturated compound and water to produce the corresponding chlorohydrin, which is then saponified with cell liquor from the cathode compartment, which contains sodium hydroxide and sodium chloride to produce the olefin oxide and aqueous brine, with the aqueous brine, which includes organic impurities, produced in the saponification, being treated with chlorate ion at an acidic pH and an elevated temperature in accordance with the invention to oxidize organics to carbon dioxide prior to introduction of the aqueous brine into the electrolytic cell. Such process for integrating electrolytic production of chlorine with production of olefin oxide is described in more detail in U.S. Pat. No. 4,008,133, which is hereby incorporated by reference.

The present invention is also applicable to the modifications of the basic integrated process for production olefin oxide, as described in U.S. application Ser. No. 35,560 filed on May 3, 1979 and U.S. application Ser. No. 35,558 filed on May 3, 1979.

As described in U.S. application Ser. No. 35,560, tertiary alkyl hypochlorite is produced from chlorine, tertiary alkanol and cell liquor derived from the cathode compartment of an electrolytic cell. The tertiary alkyl hypochlorite is contacted in a chlorohydrin production zone with an olefinically unsaturated compound and water to produce chlorohydrin. The effluent from the chlorohydrin production zone is contacted with an organic extraction solvent to recover organics present in the effluent, with such organics including the chlorohydrin and tertiary alkanol. The organic extraction solvent is then contacted with cell liquor from the cathode compartment to effect saponification of the chlorohydrin to the corresponding epoxy compound; then the epoxy compound is separated from the saponification effluent. Tertiary alkanol present in the saponification effluent is extracted into an aqueous phase which is employed in the hypochlorite production, with such aqueous phase including the aqueous brine produced in the saponification. Such aqueous phase is employed in the hypochlorite production, with the brine solution, produced in the saponification, and containing organic impurities, being eventually recovered from the hypochlorite production reactor, along with the brine solution produced in the hypochlorite production. All or a portion of such brine solution is subjected to the chlorate ion oxidation in accordance with the present invention prior to recycle thereof to the electrolytic cell. Alternatively, as described in such application, an aqueous brine solution may be recovered from the saponification, with the tertiary alkanol being initially present in the organic solvent, followed by extraction of the tertiary alkanol from the organic solvent. In such an embodiment, the aqueous brine solution separated from the saponification, which contains organic impurities, may be treated with chlorate ion in accordance with the present invention to oxidize the carbon atoms of the organic impurities to carbon dioxide.

As hereinabove noted, the present invention is also applicable to the modified process described in U.S. application Ser. No. 35,558. As described in such application, chlorine and tertiary alkanol dissolved in an organic solvent are reacted with aqueous alkali from the cell to produce tertiary alkyl hypochlorite. Tertiary alkyl hypochlorite dissolved in the inert organic solvent is recovered and reacted with olefinically unsaturated compound and water to produce the corresponding chlorohydrin and tertiary alkanol. Chlorohydrin and tertiary alkanol in the organic solvent are recovered and saponified with aqueous alkali derived from the cathode compartment of the electrolytic cell to produce the epoxy compound and aqueous brine. The epoxy compound is recovered as product, and tertiary alkanol dissolved in the inert organic solvent is, recovered and recycled to the hypochlorite production. The aqueous brine solution produced in the saponification may be introduced into the hypochlorite production reactor in order to recover any tertiary alkanol present therein, with such brine being recovered from the hypochlorite production reactor along with the brine generated in the hypochlorite production. The brine is treated with chlorate ion in accordance with the present invention prior to recycle to the electrolytic cell. Alternatively, all or a portion of the brine solution may be treated in accordance with the present invention prior to recycle to the cell without introduction into the hypochlorite production reactor. Such brine may be treated prior to being introduced into the hypochlorite production reactor.

Thus, in accordance with the preferred aspect of the invention, the aqueous brine solution produced in the saponification, which includes organic impurities, and which is treated in accordance with the present invention prior to introduction into the electrolytic cell may be introduced or employed in another processing reactor, such as a hypochlorite production reactor, prior to being treated with chlorate ion in accordance with the present invention. Thus, the term "aqueous brine or aqueous alkali chloride solution derived from the saponification of chlorohydrin" includes brine solutions or aqueous alkali chloride solutions which may have been employed in another reactor subsequent to the saponification, and prior to the treatment in accordance with the present invention.

In accordance with the present invention, an aqueous alkali chloride solution; in particular, an aqueous brine solution, which is derived from the saponification of chlorohydrin to epoxy compound, and which may contain at least 1000 ppm organic compounds, such as glycols, polyglycols, chlorohydrins and the like, with such organic compounds in some cases being present in amounts of up to 10,000 ppm and more, can be treated with chlorate ions, at an acidic pH and elevated temperature, as hereinabove described, to oxidize the organic impurities to carbon dioxide and provide an aqueous brine having an organic content which will not interfere with the operation of the electrolytic cell for producing chlorine. In general, the total organic content is reduced to less than 100 ppm, and in most cases less than 50 ppm.

In accordance with the preferred aspect of the present invention wherein the aqueous alkali chloride is derived from the saponification of a chlorohydrin to produce an olefin oxide, such olefin oxide may be produced from any one of a wide variety of olefinically unsaturated compounds including both mono-olefinically and di-olefinically unsaturated compounds. The olefinically unsaturated compounds generally employed as feed are represented by the following structural formula:

$$R_1-CH-CH-R_2$$

wherein $R_1$ and $R_2$ are each separately either hydrogen; alkyl; halo alkyl; phenyl; naphthyl; halo-and alkyl substituted phenyl; halo-and alkyl substituted naphthyl; alkenyl and halo substituted alkenyl; and $R_1$ and $R_2$ can be linked together to provide a cycloalkene (generally 5 to 10 carbon atoms). The alkyl and alkenyl groups generally contain 1 to 6 carbon atoms and the halo group is preferably iodo-, bromo-, or chloro-, most preferably chloro-. As representative examples of the most suitable feedstocks, there may be mentioned: alkenes having from 2 to 6 carbon atoms, preferably 2 to 4 carbon atoms with ethylene and propylene being particularly preferred; styrene, stillbene; butadiene; chloroprene; allyl chloride; allyl bromide; bromoprene; cyclohexene, and cyclopentene. The epoxy compounds generally produced in accordance with the invention are represented by the following structural formula:

wherein $R_1$ and $R_2$ are as defined above.

The present invention will be further described with respect to preferred embodiments thereof illustrated in the accompanying drawings, wherein.

It is to be understood, however, that the scope of the invention is not to be limited to such preferred embodiments.

The preferred embodiments will be described with respect to the production of propylene oxide from propylene; however, it is to be understood that the embodiments may also be employed for the production of other olefin oxides from other olefinically unsaturated compounds; e.g., epichlorohydrin from allyl chloride.

Figure 1:
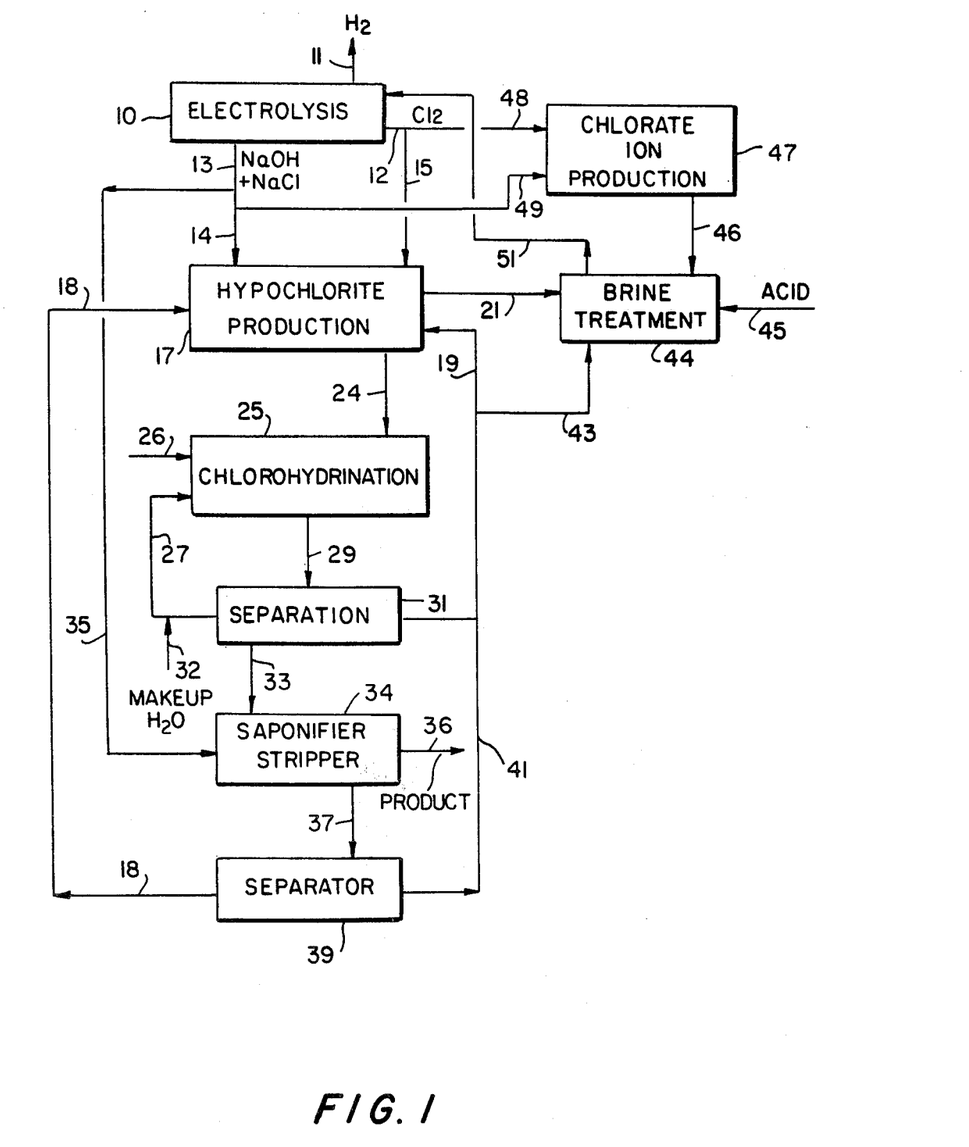
FIG. 1 is a simplified schematic flow diagram of one embodiment of the present invention.

Referring now to FIG. 1, there is shown an electrolytic cell, schematically generally indicated as as 10, wherein, as known in the art, hydrogen is produced at the cathode and chlorine at the anode, using sodium chloride as electrolyte. The hydrogen is withdrawn from the cell, as net product, through line 11. Chlorine produced in the cell is withdrawn therefrom through line 12, and caustic cell liquor, containing sodium hydroxide and sodium chloride, dissolved in water, is withdrawn from the cell through line 13.

A portion of the cell liquor in line 14, and chlorine in line 15 are introduced into a hypochlorite production zone, schematically generally indicated as 17, which is further provided with recycle tertiary alkanol, in particular tertiary butanol, dissolved in an inert organic solvent, which is immiscible with water, with such tertiary butanol being introduced into the hypochlorite production zone 17 through line 18. The hypochlorite production zone 17 may include an absorption tower wherein chlorine is initially absorbed in the solution of tertiary alkanol in organic solvent, followed by contacting of such solution in a hypochlorite production reactor with the aqueous cell liquor. The hypochlorite production zone 17 may be further provided with a recycle brine solution, which may contain some tertiary alkanol, provided through line 19, and obtained as hereinafter described. The organic solvent employed in the hypochlorite production zone may be any one of a wide variety of organic solvents which is inert, immiscible with the aqueous phases present in the process and is a solvent for chlorine as well as hypochlorite, alkanol and chlorohydrin employed and/or produced in the process. The term "inert" as used herein means that the solvent does not adversely affect the various reactions. As representative examples of such solvents, there may be mentioned: chlorinated hydrocarbons, including chlorinated aromatics, and chlorinated aliphatics (saturated), chlorinated paraffins, such as carbon-tetrachloride, chloroform, dichloropropane, etc. ketones; e.g., methylethyl ketone, methylisobutyl ketone, acetone, and the like. Such solvents may be employed alone or as a mixture of two or more thereof. A preferred solvent is carbon tetrachloride alone, or in admixture with dichloropropane.

In the hypochlorite production zone 17, the tertiary alkanol is converted to a tertiary alkyl hypochlorite; in particular tertiary butylhypochlorite, and there is also produced an aqueous brine solution. The brine solution is withdrawn from the hypochlorite production zone 17 through line 21, (such aqueous brine solution would also include any aqueous brine introduced through line 19) and is treated, as hereinafter described, in accordance with the present invention.

The hypochlorite production reaction zone 17 is operated at the conditions described in U.S. Pat. No. 4,008,133.

An organic stream, comprised of tertiary butyl hypochlorite dissolved in organic solvent, is withdrawn from the hypochlorite production zone 17 through line 24, and introduced into a chlorohydrin production reaction zone, schematically generally indicated as 25. Propylene, in line 26 which is preferably initially dissolved in the organic stream introduced through line 24, is also introduced into the chlorohydrin production zone 25 along with a recycle water stream in line 27, obtained as hereinafter described. The chlorohydrin production reactor is operated at the conditions known in the art, as described in U.S. Pat. No. 4,008,133.

A liquid reaction effluent, which contains tertiary butanol, propylene chlorohydrin, as well as any reaction byproducts, and which further contains a light aqueous phase, is withdrawn from the chlorohydrin production zone 25 through line 29 and introduced into a separator, schematically generally indicated as 31, in order to effect separation of an aqueous phase from an organic phase. An aqueous phase, which primarily contains water, is withdrawn from the separator 31 for recycle to the chlorohydrin production zone 25 through line 27. Makeup water may be provided to such water recycle stream through line 32.

An organic phase is withdrawn from separator 31 through line 33 and introduced into a saponification stripping zone, schematically generally indicated as 34, which is also provided with caustic cell liquor through line 35 to effect saponification of propylene chlorohydrin to propylene oxide. The saponification zone 34 is operated at the conditions described in U.S. Pat. No. 4,008,133.

The saponification zone 34 is preferably operated as a saponification stripping zone, whereby there is separated from the saponification effluent propylene oxide, as well as any light end products; i.e., acetone. Such product is withdrawn through line 36 for purification, as required, and known in the art.

The remaining portion of the saponification effluent is withdrawn from the saponification zone 34 through line 37 and introduced into a separator, schematically generally indicated as 39, in order to effect separation of an aqueous phase from an organic phase. In particular, in separator 39, an aqueous brine solution, which may contain some minor amounts of tertiary butanol, as well as organic impurities, such as propylene glycol, etc. is withdrawn from separator 39 through line 41.

An organic stream, containing tertiary butanol dissolved in the organic solvent is withdrawn from separator 39 through line 18 for introduction into the hypochlorite production zone, whereby the tertiary butanol is effectively recycled for generation of tertiary alkyl hypochlorite.

The aqueous solution in line 41, depending on the tertiary alkanol content thereof, may be either introduced into the hypochlorite production zone 17 through line 19, or through line 43 into a brine treatment zone, schematically generally indicated as 44. Thus, the brine treatment zone 44 may be provided with brine solution, containing organic impurities directly from the saponification reaction, or indirectly from the saponification reactor through the hypochlorite production zone, or a combination of both. The brine treatment zone 44 is provided with suitable acid through line 45 to maintain the operating pH, as hereinabove described. Such acid is preferably hydrochloric acid.

The brine treatment zone 44 is also provided with an aqueous solution of chlorate ions through line 46. Such chlorate ions may be produced in a separate chlorate ion production zone, schematically generally indicated as 47 by providing chlorine from the cell through line 48 and alkali cell liquor, containing sodium chloride and sodium hydroxide, obtained from the cathode compartment, through line 49. Such chlorate ion production zone is operated at conditions known in the art (at elevated temperature) in order to produce sodium chlorate, which is provided to the brine treatment zone through line 46.

The brine treatment zone 44 is operated at the conditions hereinabove described in order to oxidize organic impurities to essentially carbon dioxide and low molecular weight products. The brine treatment zone 44 may include in addition to the chlorate ion treatment vessel, a stripping vessel, in order to strip carbon dioxide produced in the oxidation, as well as any remaining volatile organics from the brine solution, prior to recycle of the brine solution through line 51 to the electrolytic cell 10.

Thus, in accordance with the present invention, organic impurity present in a brine solution to be recycled to an electrolytic cell is effectively treated to reduce the organic content thereof to a value which will not interfere with the operation of an electrolytic cell by oxidizing such organic impurities to carbon dioxide by the use of chlorate ions at an elevated temperature; i.e., a temperature of at least 130° C., and at an acidic pH, i.e., a pH of less than 5, preferably less than 4, and most generally less than 3, with the best results being obtained at a pH of less than 1.

It is to be understood, that in some cases it is possible to provide for the desired reduction in organic content without introduction of all of the brine solution which is to be introduced into the electrolytic cell into the brine treating zone. Thus, all or a portion of the brine generated in the saponification reactor, and all or a portion of the brine generated in the hypochlorite production may be introduced directly into the brine treatment zone, with any portion not so introduced into the brine treatment zone being directly introduced into the electrolytic cell, provided that the total organic content of such brine solution is at a value at which the cell can be effectively operated.

Figure 2:
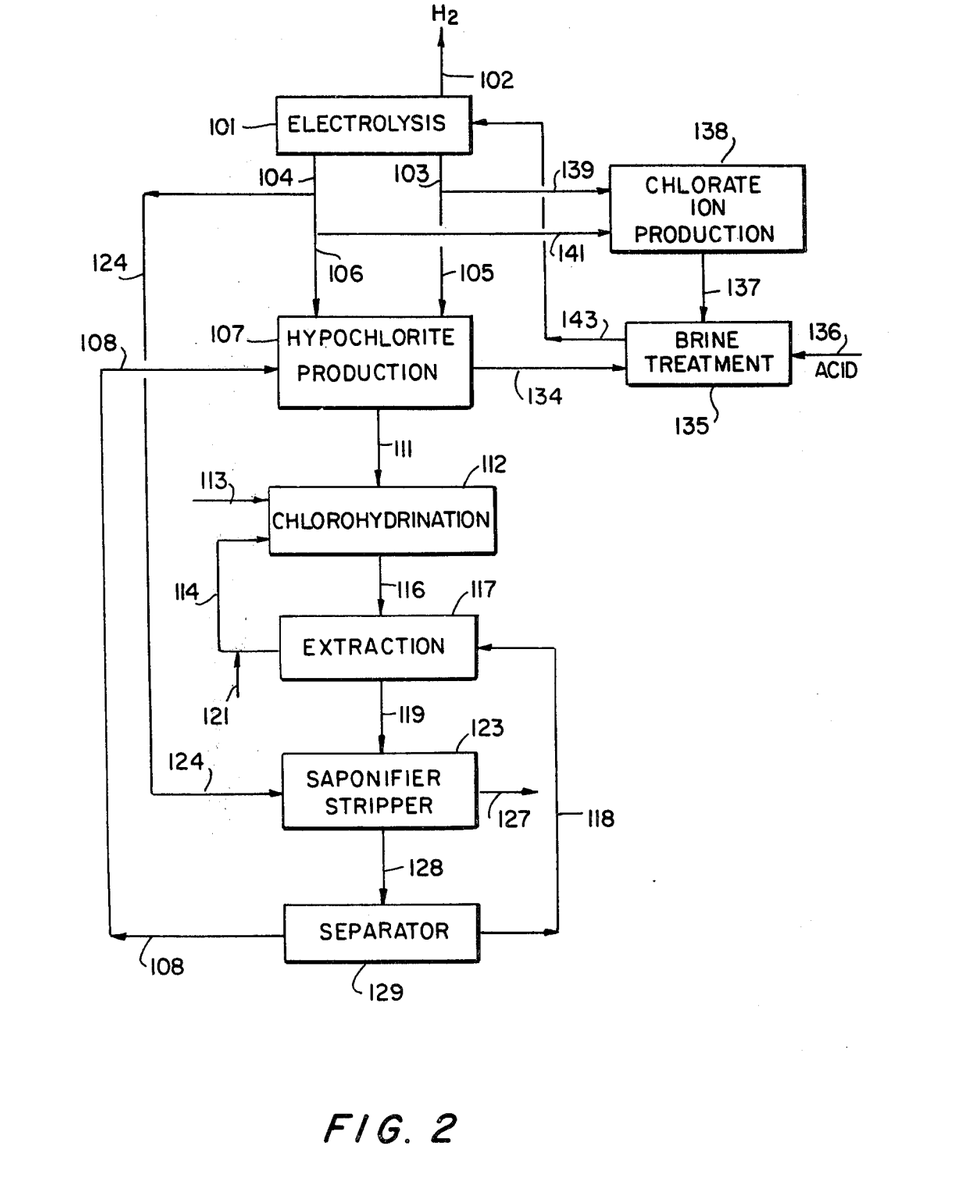
FIG. 2 is a simplified schematic flow diagram of a further embodiment of the present invention.

A further embodiment of the invention is shown in FIG. 2 of the drawings.

Referring now to FIG. 2 of the drawings, there is shown electrolytic cell 101, wherein, as known in the art, hydrogen is produced at the cathode, and chlorine at the anode, using sodium chloride as electrolyte. The operation is as hereinabove described, with hydrogen being recovered through line 102, chlorine through line 103, and an aqueous cell liquor from the cathode compartment, which includes sodium chloride and sodium hydroxide, through line 104.

The chlorine in line 105, as well as cell liquor from the cathode compartment in 106 are introduced into a hypochlorite production reactor, schematically generally indicated as 107 wherein the cell liquor and chlorine contact recycle alkanol present in an aqueous brine solution, introduced through line 108 and obtained as hereinafter described. In the hypochlorite production reactor 107, the tertiary alkanol is converted to tertiary alkyl hypochlorite; in particular tertiary butyl hypochlorite, which is withdrawn through line 111.

An aqueous brine solution, which includes the brine introduced through line 108, as well as the brine generated in the hypochlorite production reactor 107 is withdrawn from the hypochlorite production zone 107 through line 134 for further treatment, as hereinafter described.

The tertiary hypochlorite in line 111 is introduced into a chlorohydrin production zone, schematically generally indicated as 112, along with propylene in line 113 as well as a recycle aqueous stream introduced through line 114. In the chlorohydrin production reactor 112, propylene chlorohydrin is produced, as well as the tertiary alkanol.

A liquid reaction effluent, which contains water, tertiary butanol, propylene chlorohydrin, as well as any reaction byproducts, is withdrawn from the propylene chlorohydrin production reactor 112, through line 116 and introduced into an extraction zone, schematically generally indicated as 117 wherein the effluent is contacted with an organic extraction solvent introduced through line 118. The organic extraction solvent is an inert organic solvent, which is immiscible with the aqueous phases, of the type hereinabove described with respect to FIG. 1. As a result of the contact between the extraction solvent and the effluent in extraction zone 117, organics present in the chlorohydrin production reaction effluent are extracted into the organic solvent phase, which is withdrawn from line 119.

An aqueous raffinate is withdrawn from the extraction zone 117 through line 114 for introduction into the chlorohydrin production reactor 112, as hereinabove described. Makeup water may be provided through line 121.

The organic extract in line 119 is introduced into a saponification reaction zone, schematically generally indicated as 123, which is preferably a combination saponifier-stripping zone.

In the saponification zone 123, the organic extract is contacted with caustic cell liquor containing sodium hydroxide, sodium chloride and water obtained from the electrolysis cell 101 through line 124. As a result of such contact, the propylene chlorohydrin is converted to propylene oxide, and the hydrogen chloride released is neutralized by the sodium hydroxide present in the cell liquor to produce sodium chloride and water.

Crude propylene oxide, which may contain light end product, such as, acetone, is withdrawn from the saponification stripping zone 123 through line 127 for further purification, as required.

The remaining portion of the effluent from the saponifier-stripper 123, in line 128, which includes water, sodium chloride, tertiary butanol, organic solvent, as well as heavy products and organic impurities is introduced into a separator, schematically generally indicated as 129, to separate organic and aqueous phases. An organic phase, containing the extraction solvent, as well as some tertiary butanol and heavier byproducts, is withdrawn from the separator 129 through line 118 for recycle to extraction zone 117. An appropriate purge (not shown) is also provided.

An aqueous brine phase, which contains tertiary butanol, is withdrawn from separator 129 for introduction into the hypochlorite production reactor 107 through line 108.

Referring back to the hypochlorite production zone 107, the aqueous brine withdrawn therefrom through line 134 generally includes organic impurities in an amount in excess of that which can be tolerated by the electrolytic cell. As a result, in accordance with the present invention, such brine solution is introduced into a brine treatment zone, schematically generally indicated as 135, along with acid in line 136 to adjust the pH, as required, with such acid preferably being hydrochloric acid, and an aqueous solution of chlorate ion, in line 137. The chlorate ions may be generated in a chlorate ion production zone 138, as hereinabove described with respect to FIG. 1, by the use of chlorine from the electrolytic cell in line 139, and cathode cell liquor in line 141.

The brine treatment is effected as hereinabove described to oxidize carbon atoms of the organics to carbon dioxide, and provide a treated aqueous brine solution which has an organic content which can be tolerated by the cell. As hereinabove described with respect to FIG. 1, the brine treatment zone 135 preferably also includes a stripping operation to remove generated carbon dioxide, as well as any volatile organics. The treated brine solution is recycled to the cell 101 through line 143.

Figure 3:
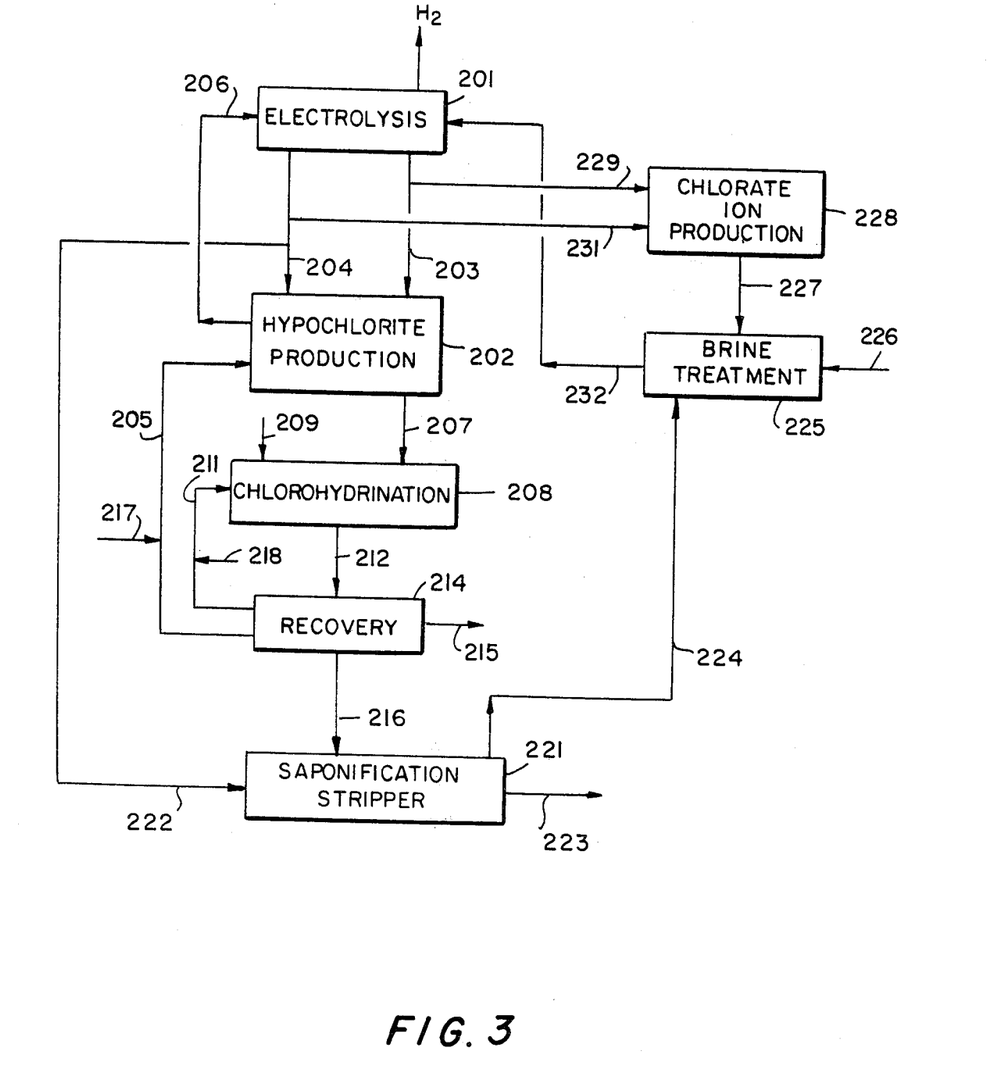
FIG. 3 is a simplified schematic flow diagram of still another embodiment of the present invention.

A further embodiment of the present invention is illustrated in FIG. 3 of the drawings. The embodiment of FIG. 3 is similar to the embodiment of FIGS. 1 and 2, except that the embodiment of FIG. 3 does not employ an organic solvent for effecting recovery of various components, as described with reference to the embodiments of FIGS. 1 and 2. In view of similarity of the embodiments, the embodiment of FIG. 3 will only be briefly described.

Referring to FIG. 3, chlorine from electrolysis cell 201 is introduced into a hypochlorite production zone, schematically generally indicated as 202 through line 203, along with cell liquor, containing sodium hydroxide and sodium chloride, derived from the cathode compartment of the cell 201, with such liquor being introduced into the hypochlorite production zone 202 through line 204. In the hypochlorite production zone, the chlorine and cell liquor contact tertiary alkanol; in particular, tertiary butanol, introduced through line 205 to produce tertiary butyl hypochlorite.

An aqueous brine solution is recovered from the hypochlorite production zone 202 through line 206, and such brine may be directly recycled to the electrolysis cell 201.

Tertiary butyl hypochlorite recovered from the hypochlorite production zone 203 through line 207 is introduced into a chlorohydrin production zone 208 along with fresh feed propylene in line 200 and water, obtained as hereinafter described, in line 211. The reaction effluent, containing propylene chlorohydrin, water, tertiary butyl alcohol and organic byproducts is withdrawn from the chlorohydrin production zone 208 through line 212 and introduced into a separation and recovery zone, schematically generally indicated as 214. The separation and recovery zone 214 contains appropriate separation units to recover recycle tertiary butanol in line 205, organic byproducts through line 215, a recycle water stream through line 211 and a chlorohydrin containing stream through line 216. A representative separation and recovery operation is described in U.S. Pat. No. 4,008,133.

The recycle tertiary butanol stream in line 205 may be provided with makeup tertiary butanol in line 217, and the recycle water stream in line 211 may be provided with makeup water through line 218.

The chlorohydrin containing stream in line 216 is introduced into a saponification zone, which is preferably combined as a saponification stripping zone, schematically generally indicated as 221 along with cell liquor, in line 222 derived from the cathode compartment of the electrolytic cell 201, with the liquor including sodium hydroxide and sodium chloride. In the saponification zone 221, the propylene chlorohydrin is converted to propylene oxide, and the hydrogen chloride released is neutralized to produce an aqueous brine solution. The propylene oxide product is recovered through line 223, and may be purified as required.

The aqueous brine stream recovered from saponification zone 221 through line 224 is introduced into the brine treatment zone, schematically generally indicated at 225, which is also provided with acid to maintain the desired pH, with the acid being preferably provided through line 226 as hydrogen chloride. The brine treatment zone 225 is also provided with an aqueous solution of chlorate ions, in line 227, with such aqueous solution being produced in a chlorate ion production zone, schematically generally indicated as 228, by reaction of chlorine introduced from the electrolytic cell 201 through line 229, and cell liquor, containing sodium hydroxide and sodium chloride, introduced from the cathode compartment of the electrolytic cell 201 through line 231.

In the brine treatment zone, as hereinabove described, the brine is treated as an elevated temperature, and at acidic conditions to oxidize organic impurities contained therein to essentially carbon dioxide, and reduce the organic content of the brine to be produced into the electrolytic cell to a value which can be tolerated by the cell, preferably less than 100 ppm.

The treated brine solution is withdrawn from the brine treatment zone 225 through line 232 and recycled to the electrolytic cell 201.

Although the invention has been described with respect to preferred embodiments thereof, it is to be understood that the scope of the invention is not limited to such preferred embodiments. In addition, the embodiment particularly described can be modified within the spirit and scope of the present invention.

For example, the present invention can be employed for treating an aqueous calcium chloride solution, containing organic impurities, recovered from saponification of a chlorohydrin with aqueous calcium hydroxide, which may also include calcium chloride and/or an aqueous calcium chloride solution recovered from the production of t-butyl hypochlorite by reaction of tertiary alkanol, chlorine and an aqueous mixture containing calcium hydroxide and calcium chloride, which may further include slurried calcium oxide. Thus, the treatment of the solution to reduce organics may be desired in the event that the calcium chloride is to be recovered as a salable product. Thus, for example, the aqueous calcium chloride produced in a process for producing olefin oxide as described in U.S. application Ser. No. 35,557, filed on May 3, 1979 or U.S. application Ser. No. 35,559, filed on May 3, 1979.

Thus, in accordance with the present invention, an aqueous salt solution, e.g., aqueous alkali or alkaline earth chloride and in particular an aqueous brine solution, which contains organic impurities, can be treated to oxidize the organic impurities to carbon dioxide by the use of chlorate ions at an acidic pH and an elevated temperature. Such treatment has particular applicability to a salt solution recovered from the saponification of a chlorohydrin to an epoxy compound, and in particular to a salt solution, containing organic impurities, which is to be ultimately employed in an electrolytic cell. Applicant has found that the treatment with chlorate ions is particularly effective for reducing the organic content to a value which can be tolerated by the cell, with such organics being converted to carbon dioxide which can be readily removed from the aqueous salt solution.

The present invention will be further described with respect to the following examples; however, the scope of the invention is not limited to such examples:

EXAMPLE I

A 500 ml, fluorocarbon-lined autoclave was charged with 118.2 g of a 23 wt percent aqueous NaCl solution containing approximately 0.50 wt. percent glycerol. 1.8 g conc. HCl, and 69.0 g of an aqueous solution containing 2.29% $NaClO_3$, 0.31% NaOH and 20.58% NaCl were also charged. The carbon content of the mixture was 1335 ppm. The mixture was heated to 160° C. and maintained at this temperature for 30 minutes. The autogenous pressure at this temperature was between 70 and 75 psig. The autoclave and contents were quickly cooled and the reaction mixture, a clear, water-white solution, was analyzed. The total organic carbon content was found to be 8 ppm. The pH of the solution was 0.95 and the residual chlorate concentration was 0.41 g/liter calculated as $NaClO_3$.

EXAMPLE II

A heavy-walled glass tube was approximately half filled with the same glycerol, NaCl, $NaClO_3$, NaOH, and HCl solutions as that used as feed in Example I. This tube was sealed and immersed in oil heated to 150° C. After 15 minutes, the tube was removed and quickly cooled. Analysis of the reaction mixture showed that the total organic carbon content had been reduced to less than 50 ppm.

EXAMPLE III

A feed similar to that of Example I but with only enough HCl added (0.6 g conc. HCl) to bring the pH of the mixture to between 2 and 3. Heating in the autoclave for 30 minutes at 160° C. resulted in a solution containing 220 ppm total organic carbon.

EXAMPLE IV

A feed similar to that of Example I but without the HCl (pH 12) and containing 1500 ppm total organic carbon was charged to the autoclave, heated to 220° C. and maintained at that temperature for 30 minutes. After cooling, the solution was found to contain 1320 ppm of carbon.

EXAMPLE V

A feed similar to that of Example I was heated in the autoclave for 30 minutes at 125° C., after cooling, the resultant solution was found to contain 630 ppm total organic carbon.

The present invention is particularly advantageous in that it is possible to effectively treat aqueous salt solutions, containing organic impurities to reduce the organic content thereof. In employing the process of the present invention in a process for producing olefin oxide wherein the olefin oxide production is integrated with the electrolysis of an aqueous alkali chloride salt, in particular sodium chloride, the process of the present invention is capable of reducing the organic contaminent content of a recycle brine to the electrolytic cell to a value which can be tolerated by the cell. Such brine solutions typically have salt concentrations of 20-24 wt. percent and are not readily subject to treatment to remove organic impurities.

Numerous modifications and variations of the present invention are possible in light of the above teachings and, therefore, within the scope of the appended claims, the invention may be practised otherwise than as particularly described.

We claim:

1. A process for treating an aqueous salt solution containing organic impurities wherein said salt is selected from the group consisting of alkali and alkaline earth chlorides, and said organic impurities are comprised of a member selected from the group consisting of glycols, aldehydes, ethers, carboxylic acids, hydrocarboxylic acids, hydroxyketones, chloroketones, chloro-organic acids, ketoacids, and chloroalcohols, comprising:
   oxidizing the organic impurities to convert the carbon atoms of the organic impurities to substantially carbon dioxide, said oxidizing consisting essentially of treatment with chlorate ions at a pH of no greater than 5.0 and a temperatue of at least 130° C.

2. The process of claim 1 wherein the pH is no greater than 4.0.

3. The process of claim 2 wherein the pH is no greater than 3.0.

4. The process of claim 3 wherein the solution is an aqueous brine solution.

5. The process of claim 4 wherein the pH is no greater than 1.0.

6. The process of claim 5 wherein the temperature is at least 140° C.

7. The process of claim 4 wherein prior to treatment the aqueous brine solution contains at least 1000 ppm of organics, and subsequent to the treatment the brine solution has an organic content of less than 100 ppm.

8. The process of claim 7 wherein the brine solution has a salt concentration of from 20 to 24 wt.%.

9. The process of claim 8 wherein the chlorate ion concentration is at least 0.1 mol per atom of organic carbon in the brine solution.

10. A process for treating an aqueous salt solution recovered from the saponification of a chlorohydrin, which contains organic impurities wherein said salt is selected from the group consisting of akali and alkaline earth chlorides, comprising:
    oxidizing the organic impurities to convert the carbon atoms of the organic impurities to substantially carbon dioxide, said oxidizing consisting essentially of treatment with chlorate ions at a pH of no greater than 5.0 and a temperatur of at least 130° C.

11. The process of claim 10 wherein the pH is no greater than 4.0.

12. The process of claim 11 wherein the pH is no greater than 3.0.

13. The process of claim 12 wherein the aqueous salt solution is a brine.

14. The process of claim 13 wherein the pH is no greater than 1.0.

15. The process of claim 14 wherein the temperature is at least 140° C.

16. The process of claim 15 wherein prior to treatment the aqueous brine solution contains at least 1000 ppm of organics, and subsequent to the treatment the brine solution has an organic content of less than 100 ppm.

17. The process of claim 16 wherein the brine solution has a salt concentration of from 20 to 24 wt.%.

18. The process of claim 17 wherein the chlorate ion concentration is at least 0.1 mol per atom of organic carbon in the brine solution.

19. The process of claim 12 wherein the aqueous salt solution is a brine.

* * * * *